United States Patent [19]
Kobayashi et al.

[11] Patent Number: 6,040,959
[45] Date of Patent: Mar. 21, 2000

[54] SLIDER WITH BLUNT EDGES

[75] Inventors: Kanji Kobayashi, Saku; Masao Yamaguchi, Komoro, both of Japan

[73] Assignee: TDK Corporation, Tokyo, Japan

[21] Appl. No.: 09/064,745

[22] Filed: Apr. 23, 1998

[30] Foreign Application Priority Data

Dec. 17, 1997 [JP] Japan ..................................... 9-347679
Apr. 15, 1998 [JP] Japan ................................... 10-104236

[51] Int. Cl.[7] ...................................................... G11B 5/60
[52] U.S. Cl. ............................................................ 360/103
[58] Field of Search ............................................. 360/103

[56] References Cited

U.S. PATENT DOCUMENTS 5,301,077  4/1994  Yamaguchi et al. .
5,612,839  3/1997  Jacques ..................................... 360/103
5,872,686  2/1999  Dorius et al. .
5,910,864  6/1999  Hira ......................................... 360/103

FOREIGN PATENT DOCUMENTS 2-301014   12/1990  Japan .
6-12645     1/1994  Japan .
6-282831   10/1994  Japan .
B2-2599380  1/1997  Japan .

*Primary Examiner*—A. J. Heinz
*Attorney, Agent, or Firm*—Oliff & Berridge, PLC

[57] ABSTRACT

A slider has a rail with a medium facing surface. At least part of a lateral wall of the rail is located closer to a center of the slider than a lateral wall of the slider. First edges between the medium facing surface of each of the rails and the lateral wall of the rail and a second edge between the lateral wall of the slider and the medium facing surface are each blunt.

19 Claims, 19 Drawing Sheets

SLIDER WITH BLUNT EDGES

BACKGROUND OF THE INVENTION

1. Field of the Invention

The present invention relates to a slider used for a floating magnetic head and so on.

2. Description of the Related Art

A floating magnetic head used for a magnetic disk unit and so on is generally made up of a thin film magnetic head element formed at the trailing end of a slider. The slider generally comprises a rail whose surface functions as a surface facing a medium (referred to as medium facing surface in the following description) or an air bearing surface and a tapered section or a step near the end on the air inflow side. The rail floats slightly above the surface of a recording medium such as a magnetic disk by means of air flow from the tapered section or step.

As disclosed in Japanese Patent Laid-open No. 6-282831 (1994), for example, such a slider requires a process for curving (rounding) edges of the rail between the medium facing surface and the outer side of the rail so that the edges will not scratch a recording medium when the slider is swung and tilted. For the slider disclosed in Japanese Patent Laid-open No. 6-282831, the outer sides of two rails are the sides of the slider.

Sliders for magnetic heads are formed through cutting a wafer in one direction on which a number of magnetic head elements are formed in a matrix for forming blocks called bars each including a plurality of magnetic head elements in a row. Rails are then formed for each bar and the bar is cut into sliders. For the slider disclosed in Japanese Patent Laid-open No. 6-282831 mentioned above, the outer sides of two rails are the sides of the slider. However, a slider with such a shape may have chippings in the rails due to machining for cutting the bar into sliders.

Therefore a slider as shown in FIG. 24 is generally known where rails 113 are formed so that sides 114 of the rails 113 are located inside sides 112 of the slider 111, that is, the cutting plane of the bar, by a given distance. A slider with such a structure will be called a two-level slider in the following description.

Processing also is performed on such a two-level slider for curving (rounding) edges of rails. As disclosed in Japanese Patent Laid-open No. 6-12645 (1994), for example, methods known for removing edges of rails include oscillating the slider on a lapping film with diamonds placed on an elastic substrate. FIG. 25 is a schematic view for illustrating this method. In the method a plurality of sliders 111 fixed to a jig 115 are pressed in the direction shown with an arrow 118 against a diamond lapping film 117 placed on a plate-shaped elastic substrate 116 made of silicone rubber, for example. While pressed against the lapping film 117, the sliders 111 are oscillated in two lateral directions for removing edges 119 of rails 113.

FIG. 26 is a magnified view of the neighborhood of the edges 119 of the rails 113 (section A in FIG. 25) having being processed in the method shown in FIG. 25.

As disclosed in Japanese Patent Laid-open No. 2-301014 (1990), another processing method is known for oscillating a lapping tape against rails of sliders while the lapping tape is reciprocated with a guide.

A reduction in amount of floatation has been desired for improving recording densities. An improvement in floatation stability has been desired as well for higher access speed. For meeting these demands a negative pressure slider has been used. In general the negative pressure slider has a recess between two rails for generating negative pressure. Such a negative pressure slider has a minute structure on the surface facing a recording medium. In particular the height of the rail is much lower than that of other types of sliders.

As shown in FIG. 27, such a negative pressure slider with a low rail height may scratch a recording medium. When a slider 121 is tilted, edges 124 between sides 122 of the slider 121 and a surface 123 of the slider 121 facing a recording medium 125 and orthogonal to the sides 122 may touch and scratch the recording medium 125. This problem is particularly noticeable in a hard disk drive used in a portable apparatus such as a notebook personal computer in which a slider often 15 tilted.

The slider 121 may be tilted in various manners. As shown in FIG. 27, the slider 121 may be tilted with one side thereof positioned lower than the other side. Furthermore, as shown in FIG. 28A, the slider 121 may be tilted with an end 131 on the air inflow side of the slider 121 positioned lower than an end 132 on the air outflow side. As shown in FIG. 28B, the slider 121 may be tilted with the end 132 on the air outflow side of the slider 121 positioned lower than the end 131 on the air inflow side. As shown in FIG. 29A, the slider 121 may be tilted with one side of the end 131 on the air inflow side of the slider 121 positioned lower than the other side of the end 132 on the air outflow side. As shown in FIG. 29B, the slider 121 may be tilted with one side of the end 132 on the air outflow side of the slider 121 positioned lower than the other side of the end 131 on the air inflow side.

SUMMARY OF THE INVENTION

It is an object of the invention to provide a slider having a rail forming part of a medium facing surface of the slider which faces a medium, at least part of a lateral wall of the rail being located closer to a center of the slider than a lateral wall of the slider so as to achieve a slider which will not scratch a recording medium when the slider is tilted.

A slider of the invention has a medium facing surface which faces a medium. A rail protrudes from the medium facing surface of the slider, such that a medium facing surface of the rail forms part of the medium facing surface of the slider. At least part of a lateral wall of the rail facing outward and is located closer to a center of the slider than a lateral wall of the slider. The slider includes at least first edges each between the medium facing surface of the rail and the outer side of the rail that faces outward and a second edge located closer to the lateral wall of the slider than the first edges. At least the first edges and the second edge of the slider are blunt (i.e., not orthogonal).

Since the first and second edges of the slider of the invention are removed, the slider will not scratch a recording medium surface with the first and second edges when the slider is tilted.

In the slider of the invention, for example, the first edges may be positioned at a level different from a level at which the second edge is positioned.

In the slider of the invention, for example, the second edge may be an edge between the medium facing surface of the slider and the lateral wall of the slider.

In the slider of the invention, for example, both the first and second edges may be made blunt by removing material to form a curved surface or a bevel.

In the slider of the invention, for example, at least two of the rails may be provided and a section for generating negative pressure may be provided between the two rails.

In the slider of the invention, for example, the periphery of the medium facing surface of the rail and the periphery of the slider on the side of the medium facing surface of the slider other than the first and second edges may be made blunt as well.

The periphery surfaces of a slider are defined as follows in the invention. The surface on the air inflow side into which air flows during operation is defined as the inflow end. The surface on the air outflow side out of which air flows is defined as the outflow end. On the other hand, the surface provided along the direction of air flow and intersecting the inflow end, the outflow end and the medium facing surface is defined as the side (lateral wall) of the slider. In most cases the inflow end and the outflow end are orthogonal to the medium facing surface and the side. In the invention the outer sides (lateral wall) of the rail(s) means two of the sides of the rail(s) closest to the sides of the slider, regardless of the number of rails formed on the slider.

Other and further objects, features and advantages of the invention will appear more fully from the following description.

BRIEF DESCRIPTION OF THE DRAWINGS

FIG. 7 is a cross section illustrating part of the processing apparatus shown in FIG. 6 including the jig seen head-on.

DETAILED DESCRIPTION OF THE PREFERRED EMBODIMENT

Preferred embodiments of the invention will now be described in detail with reference to the accompanying drawings. A slider of a first embodiment of the invention is one used for a thin film magnetic head. The slider has a medium facing surface which faces a medium and comprises a rail that forms part of the medium facing surface of the slider, at least part of an outer side (lateral wall) of the rail being located closer to a center of the slider than a lateral wall of the slider. The slider includes at least first edges each between the medium facing surface of the rail and the lateral wall of the rail and a second edge located closer to the lateral wall of the slider than the first edges. The first edges and the second edge of the slider are each removed to form a curved surface. That is, the first and second edges are blunt.

Figure 2:
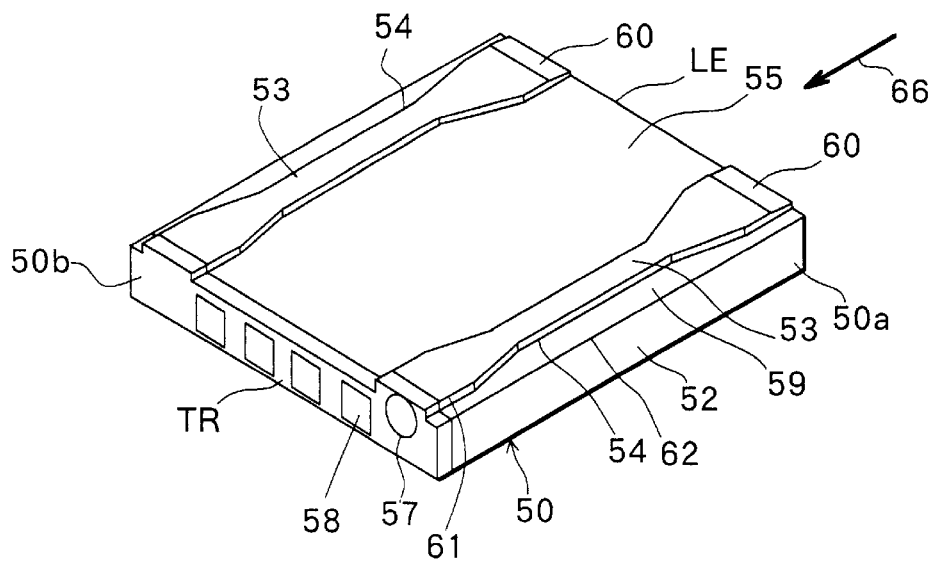
FIG. 2 is a perspective view for illustrating an example of a slider of the first embodiment of the invention.

FIG. 2 shows an example of such a slider. The first edges and the second edge of the slider are each removed to form a curved surface as described above. The slider 50 shown is a negative pressure slider having two rails 53 whose surface functions as a medium facing surface. The rails 53 are formed so that outer sides (lateral wall) 54 of the rails 53 are placed inside sides (lateral wall) 52 of the slider 50, that is, cutting sections of a bar, by a given distance. Thus, surfaces 59 of the slider, which face the medium, exist between each lateral wall 54 of the rails and each lateral wall 52 of the slider.

The direction of air flow during operation is shown with numeral 66 in FIG. 2. For the slider 50, the surface on the air inflow side into which an air flows is defined as inflow end LE. The surface on the air outflow side out of which an air flows is defined as outflow end TR. On the other hand, the surfaces provided along the direction of air flow and intersecting inflow end LE, outflow end TR and the medium facing surface are defined as the sides of the slider 50. In most cases inflow end LE and outflow end TR are orthogonal to the medium facing surface and the sides. For the slider 50 shown in FIG. 2, the outer sides 54 of the rails 53 mean two of the sides of the rails 53 closest to the sides 52 of the slider 50.

Between the two rails 53 is a negative pressure generating section 55 in the form of concavity. The width of each of the rails 53 is not uniform from the air inflow side to the air outflow side. The air inflow side is the widest and the air outflow side is the next widest while the section in between is the narrowest. A tapered section 60 is formed in the neighborhood of the end of the air inflow side of each of the rails 53. The height of the tapered section is lower at the end. A magnetic head element 57 and terminals 58 connected to the magnetic head element 57 are formed at the end of the slider at the air outflow side. The height of each of the rails 53 (the depth of the negative pressure generating section 55) is of the order of μm (0.5 to 5 μm, for example). The width between the side 52 of the slider 50 and the outer side 54 of the rail 53 is of the order of tens of μm (10 to 60 μm, for example).

The slider 50 includes first edges 61 each between the medium facing surface of each of the rails 53 and the outer side of the rail 53 and second edges 62 each between a side of the slider 50 and a surface of the slider 50 that faces a recording medium and is orthogonal to the side of the slider 50. The first edges and the second edges of the slider are each removed to form a curved surface.

The majority of the part indicated with numeral 50a of the slider 50 shown in FIG. 2 is made of aluminum oxide and titanium carbide ($Al_2O_3$-TiC), for example. Part of the air outflow side 50b is made of alumina ($Al_2O_3$) surrounding the magnetic head element 57 and the terminals 58.

Figure 1:
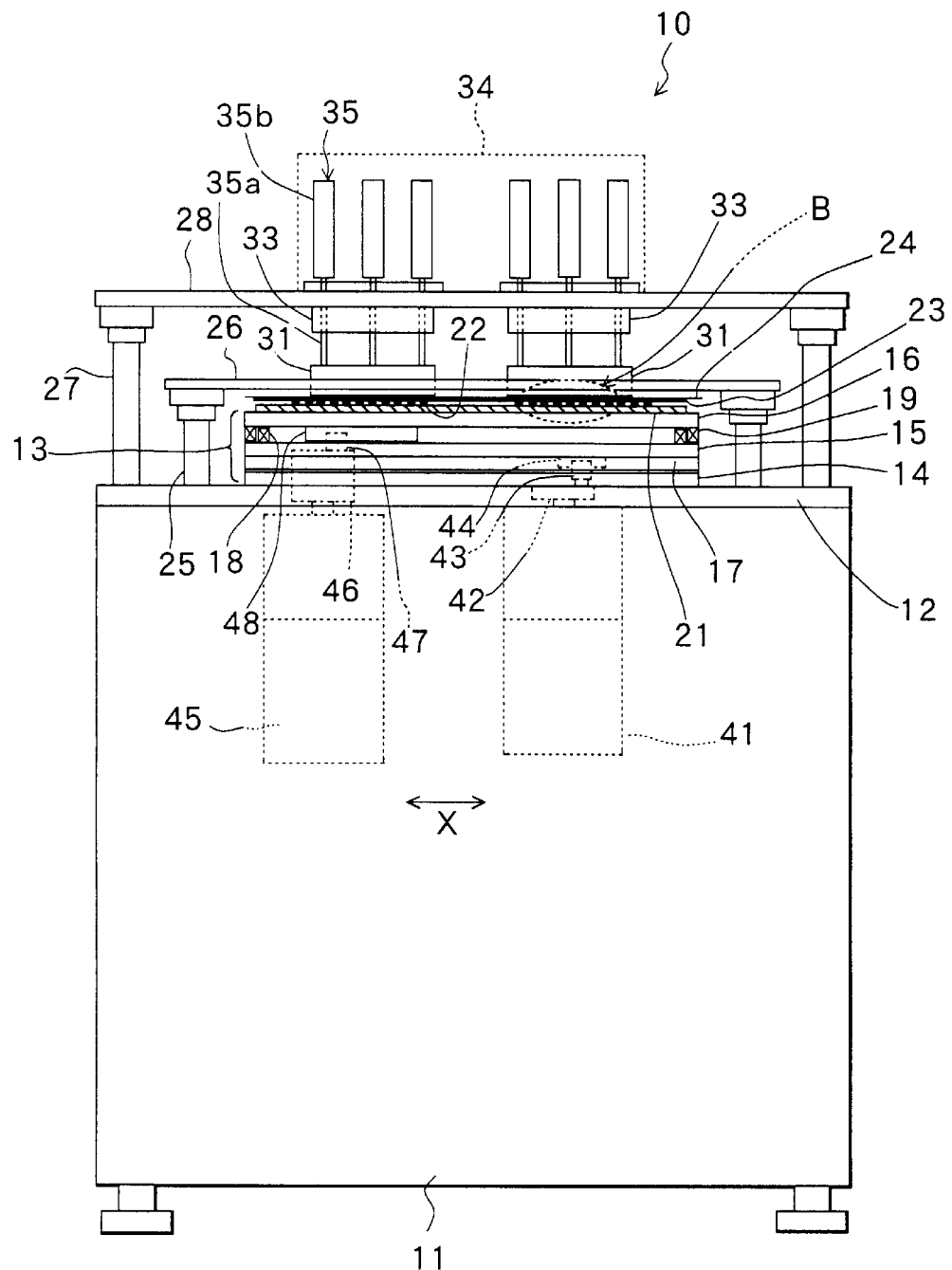
FIG. 1 is a front view of the overall structure of an apparatus for obtaining a slider of a first embodiment of the invention.
Figure 3:
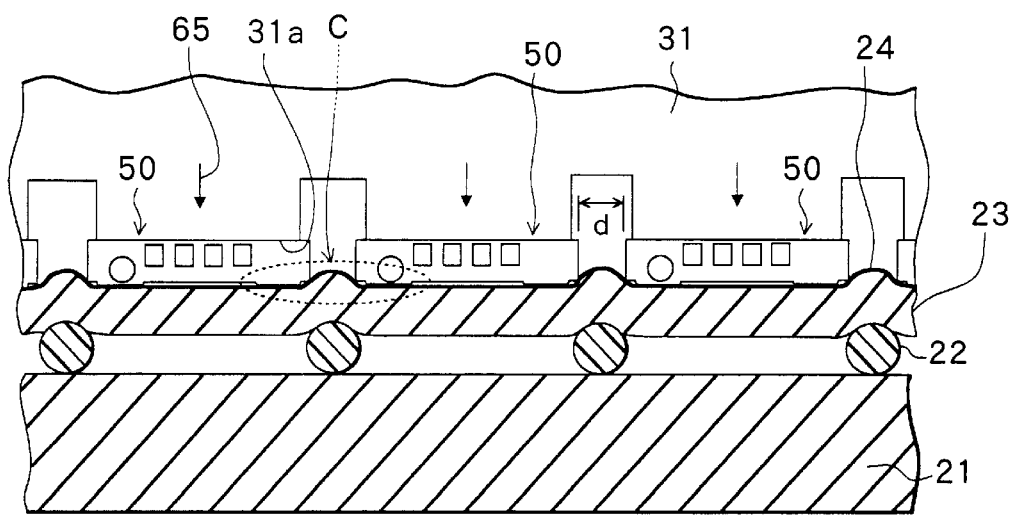
FIG. 3 is a magnified cross section of B in FIG. 1.
Figure 4:
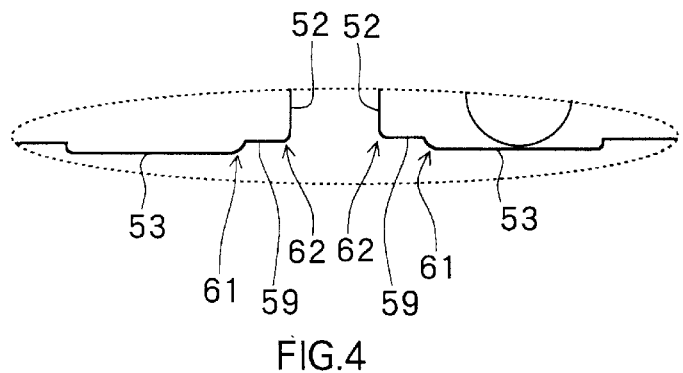
FIG. 4 is a magnified cross section of C in FIG. 3.

An apparatus for obtaining the slider of the embodiment will now be described. FIG. 1 is a front view of the overall structure of the processing apparatus. FIG. 3 is a magnified cross section of B in FIG. 1. FIG. 4 is a cross section further magnifying C in FIG. 3. The processing apparatus 10 is provided for removing specific edges of sliders.

The processing apparatus 10 comprises a main body 11 on which a base 12 is provided. On the base 12 an X-Y table 13 movable in the X direction and Y direction is placed. The X direction is the lateral direction in FIG. 1. The Y direction is the direction orthogonal to the sheet surface. The X-Y table 13 comprises: a fixed plate 14 fixed to the base 12; an X-direction oscillating plate 15 placed on the fixed plate 14; and a Y-direction oscillating plate 16 placed on the X-direction oscillating plate 15. Guides (not shown in the figure) each having a bearing and extending in the X direction are provided on the top surface of the fixed plate 14 at both ends thereof in the Y direction. Engaging sections 17 extending in the X direction are provided on the lower surface of the X-direction oscillating plate 15 at both ends thereof in the Y direction for movably engaging with the guides provided on the fixed plate 14. The oscillating plate 15 moves in the X direction with the engaging sections 17 moving along the guides on the fixed plate 14. Guides 18 each having a bearing and extending in the Y direction are provided on the top surface of the X-direction oscillating plate 15 at both ends thereof in the X direction. Engaging sections 19 extending in the Y direction are provided on the lower surface of the Y-direction oscillating plate 16 at both ends thereof in the X direction for movably engaging with the guides 18 provided on the X-direction oscillating plate 15. The oscillating plate 16 moves in the Y direction with the engaging sections 19 moving along the guides 18. The X-Y table 13 corresponds to an oscillating means or a drive apparatus of the invention.

On the Y-direction oscillating plate 16, a plate-shaped elastic member 21; a plurality of wires 22 placed in one direction at given intervals on the elastic member 21; a lapping film retainer 23 in the form of sheet having elasticity placed on the wires 22; and a diamond lapping film 24 having flexibility placed on the lapping film retainer 23 and thereby retained are provided. The diamond lapping film 24 corresponds to a lapping member of the invention. The lapping film retainer 23 corresponds to a lapping member retainer of the invention. The elastic member 21 and the wires 22 correspond to deforming means or apparatus of the invention. The elastic member 21, the wires 22 and the lapping film retainer 23 correspond to lapping member retaining means. The elastic member 21, the wires 22, the lapping film retainer 23 and the diamond lapping film 24 will be described in detail later on.

A plate 26 supported with four shafts 25 for determining a position of a jig is placed above the diamond lapping film 24. The lower ends of the shafts 25 are inserted to main body 11 to be connected to a drive unit not shown in the main body 11. The plate 26 is vertically moved with the shafts 25 vertically moving by means of the drive unit.

A plate 28 supported with four shafts 27 for determining positions of pressurizing members is placed above the plate 26. The lower ends of the shafts 27 are inserted to main body 11 to be connected to a drive unit not shown in the main body 11. The plate 28 is vertically moved with the shafts 27 vertically moving by means of the drive unit.

The plate 26 has a plurality of holes to which a jig 31 is inserted. frames 33 for determining positions of the pressurizing members are fixed to the plate 28 in positions corresponding to the holes in the plate 26. The frames 33 each have three holes. An enclosure 34 for the pressurizing members is provided on the plate 28. A plurality of pressurizing members 35 are provided inside the enclosure 34. Each pressurizing member 35 has a spindle 35a and a weight 35b coupled to the upper end of the spindle 35a. The spindles 35a of the pressurizing members 35 are inserted to the holes in the frames 33. The tips of the spindles 35a come to contact with the upper end of the jig 31 inserted to the holes in the plate 26. Loads of three of the pressurizing members 35 are thereby applied to each of the jigs 31. As shown in FIG. 3 a plurality of sliders 50 are fixed to the jigs 31.

An X-direction oscillation motor 41 is provided in the main body 11. A disk-shaped rotator 42 is fixed to a drive shaft of the oscillation motor 41. A cam 43 having a bearing is fixed to a position decentered from the drive shaft of the oscillation motor 41 on the rotator 42. A guide 44 extending in the Y direction for guiding the cam 43 is provided on the lower surface of the X-direction oscillating plate 15. The cam 43 rotates with rotation of the oscillation motor 41. The cam 43 thereby moves along the guide 44 so that the guide 44 and the oscillating plate 15 oscillate in the X direction. The base 12 and the fixed plate 14 each have holes to which the rotator 42 and the cam 43 are inserted.

A Y-direction oscillation motor 45 is provided in the main body 11. A disk-shaped rotator 46 is fixed to a drive shaft of the oscillation motor 45. A cam 47 having a bearing is fixed to a position decentered from the drive shaft of the oscillation motor 45 on the rotator 46. A guide 48 extending in the X direction for guiding the cam 47 is provided on the lower surface of the Y-direction oscillating plate 16. The cam 47 rotates with rotation of the oscillation motor 45. The cam 47 thereby moves along the guide 48 so that the guide 48 and the oscillating plate 16 oscillate in the Y direction. The base 12, the fixed plate 14 and the oscillating plate 15 each have holes to which the rotator 46 and the cam 47 are inserted.

Reference is now made to FIG. 3 and FIG. 4 for describing the jig 31, the sliders 50, the elastic member 21, the wires 22, the lapping film retainer 23 and the diamond lapping film 24. As shown in the figures, a plurality of jig fixtures 31a are provided at the lower end of the jig 31. The sliders 50 to be processed are fixed to the jig fixtures 31a through bonding, for example.

The wires 22 provided on the elastic member 21 are each placed in a position corresponding to a first edge 61 and a second edge 62. The first edge 61 is the edge between the medium facing surface of the rail 53 and the outer side 54 of the rail 53 of the slider 50 fixed to the jig 31. The second edge 62 is the edge between the side 52 of the slider 50 and a surface 59 of the slider 50 facing a recording medium and orthogonal to the side 52. Consequently, the lapping film retainer 23 placed on the wires 22 and the diamond lapping film 24 retained by the retainer 23 are deformed so that parts corresponding to the first edges 61 and the second edges 62 project towards the first edges 61 and the second edges 62. As a result, the diamond lapping film 24 is brought to contact with at least the first edges 61 and the second edges 62. Both ends of each of the wires 22 are fastened and fixed to projections formed at ends of the oscillating plate 16.

The elastic member 21 is made of a material such as silicone rubber and may have a hardness of 30 and a thickness of 5 mm, for example.

The wires 22 are made of synthetic fibers such as nylon (trade name) or stainless steel, for example. The outer diameter of each of the wires 22 is appropriately determined depending on factors such as distance 'd' (referred to as 'separation width' below) between neighboring two of the sliders 50 fixed to the jig 31 so that the diamond lapping film 24 is brought to contact with the first edges 61 and the second edges 62. It is preferable to determine the outer diameter in a range from 0.05 to 0.4 mm. It is preferable that the outer diameter of each of the wires 22 is longer than separation width 'd'. In this embodiment separation width 'd' is 0.2 mm and the outer diameter of the wire 22 is 0.285 mm as an example.

The lapping film retainer 23 is made of a material such as silicone rubber and has a hardness of 50, for example and preferably has a thickness of 0.1 to 0.3 mm. In this embodiment the thickness is 0.3 mm as an example.

The diamond lapping film 24 is made up of a flexible film and a lapping layer formed thereon, for example. The flexible film may be made of a material such as polyethylene terephthalate (PET). The lapping layer may be formed through applying diamond grains with a binder over the flexible film to be then dried. In this embodiment the diameter of the diamond grain is 0.25 $\mu$m, the flexible film thickness 4 $\mu$m, the lapping film thickness 3 $\mu$m and the whole thickness of the diamond lapping film 24 is 7 $\mu$m as an example.

It is preferable that the oscillation width of the X-Y table 13 in the Y direction is wider than that in the X direction. When separation width 'd' is 0.2 mm and the outer diameter of the wire 22 is 0.285 mm as described above, the oscillation width is preferably 0.05 to 0.15 mm in the X direction and 3 to 10 mm in the Y direction. In this embodiment the oscillation width is 0.08 mm in the X direction and 5 mm in the Y direction as an example.

The operation of the processing apparatus 10 of the embodiment will now be described. For processing the sliders 50 using the processing apparatus 10, the plurality of sliders 50 to be processed are fixed to the jig 31 through bonding, for example, with the surface of the sliders 50 to face a recording medium down. The sliders 50 at this stage are obtained through polishing the surface to be the medium facing surface of a bar including a plurality of magnetic head elements placed in line and forming rails on the bar by means of ion milling and so on and then cutting the bar.

Next, the jig 31 with the sliders 50 fixed thereto is inserted to the holes in the plate 26 so that the sliders 50 are brought to contact with the lapping film retainer 23. With the shafts 35a of the pressurizing members 35 brought to contact with the upper end of the jig 31, a pressure is applied to the jig 31 in the direction shown with arrow 65 in FIG. 3. The lapping film retainer 23 placed on the wires 22 and the diamond lapping film 24 retained by the retainer 23 are deformed so that parts of the sliders 50 corresponding to the first edges 61 and the second edges 62 project towards the first edges 61 and the second edges 62. As a result, the diamond lapping film 24 contacts at least the first edges 61 and the second edges 62.

Next, the X-direction oscillation motor 41 and the Y-direction oscillation motor 45 are driven for oscillating the X-Y table 13 in the X and Y directions. The diamond lapping film 24 is thereby oscillated to the first edges 61 and the second edges 62 of the sliders 50. Processing is thus performed on the sliders 50 for curving (rounding) the first edges 61 and the second edges 62 at the same time. As a result, the sliders 50 each with the first edges 61 and the second edges 62 curved as shown in FIG. 4 are obtained.

The radius of curvature formed through removing each of the first edges 61 and the second edges 62 is appropriately determined in a desirable range.

As described so far, the sliders 50 are obtained wherein the first edges 61 and second edges 62 are removed to form a curved surface. The sliders 50 will not scratch a surface of a recording medium with the first edges 61 and the second edges 62 when tilted.

A negative pressure slider has a greater possibility of touching a recording medium with the first edge 61 when tilted than a slider not generating a negative pressure. Therefore the embodiment of the invention is particularly effective for negative pressure sliders.

Figure 27:
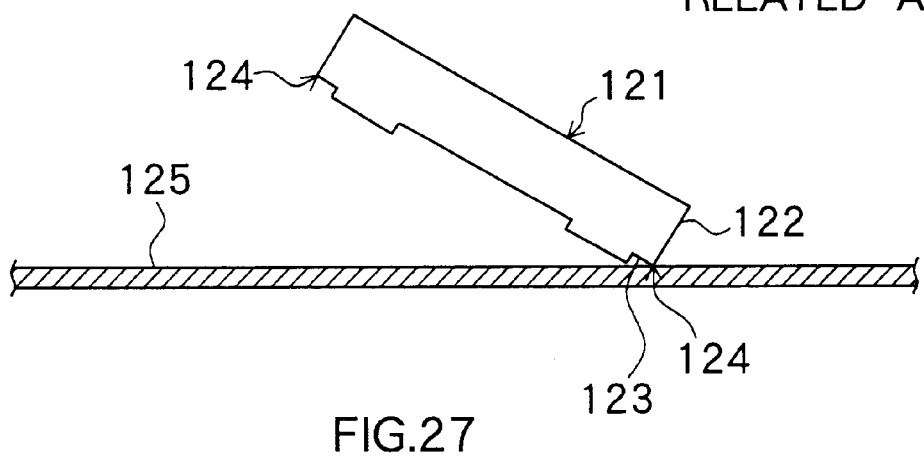
FIG. 27 is an explanatory view for illustrating a manner in which a slider is tilted.
Figure 28A:
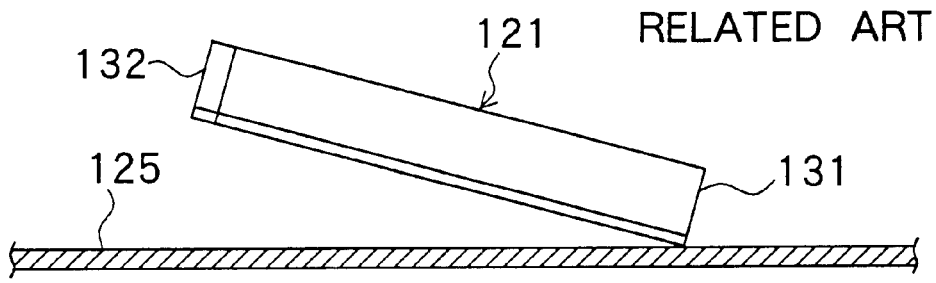
FIG. 28A and FIG. 28B are explanatory views each for illustrating a manner in which a slider is tilted.
Figure 28B:
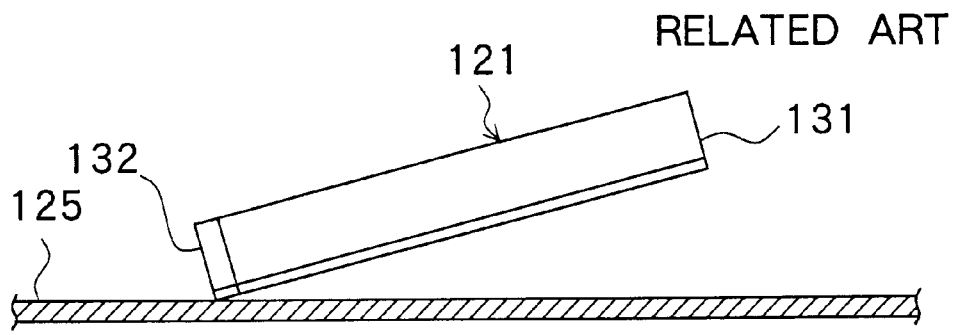
Figure 29A:
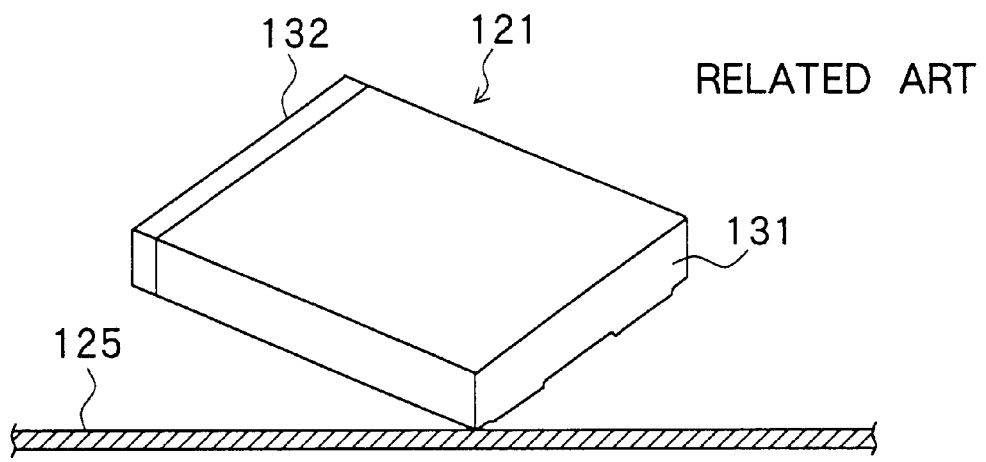
FIG. 29A and FIG. 29B are explanatory views each for illustrating a manner in which a slider is tilted.
Figure 29B:
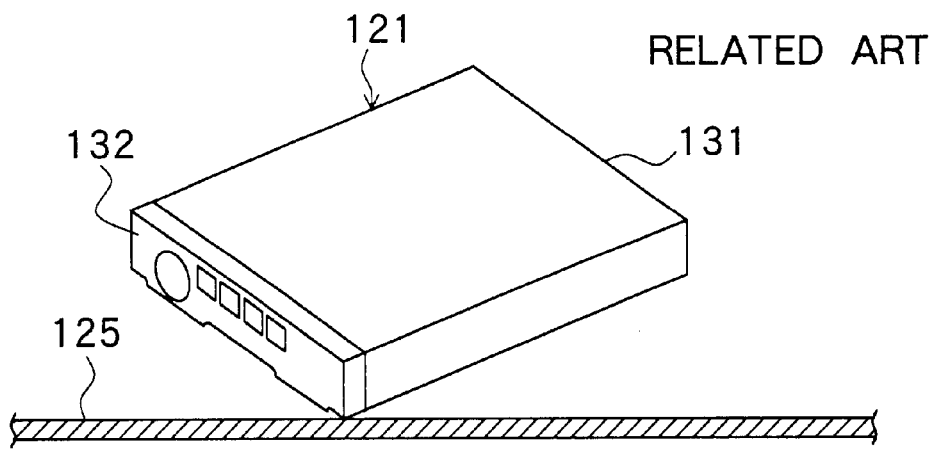

In the embodiment, when the first edges 61 and the second edges 62 are removed, the diamond lapping film 24 touches as well the periphery of the medium facing surface of the rails 53 other than the first edges 61 and the periphery of the slider 50 on the side of the medium facing surface other than the second edges 62 and these parts are thus removed at the same time. Therefore the slider 50 is obtained which will not scratch a recording medium when tilted in various manners as shown in FIG. 27 to FIG. 29.

In the processing apparatus 10 for obtaining the slider of the embodiment, the diamond lapping film 24 is deformed so as to come to contact with the first edges 61 and the second edges 62 of the sliders 50. If the diamond lapping film 24 is not retained by the lapping film retainer 23 with elasticity but retained simply with guides and so on as disclosed in Japanese Patent Laid-open 2-301014 (1990), for example, and the diamond lapping film 24 is deformed so as to come to contact with the first edges 61 and the second edges 62 of the sliders 50 and the lapping film 24 is oscillated to the first edges 61 and the second edges 62, the lapping film 24 may be easily cut and stable processing of the sliders 50 is hard to achieve. In contrast, the embodiment allows the diamond lapping film 24 to be retained by the lapping film retainer 23 with elasticity. As a result, cutting of the diamond lapping film 24 is prevented and processing of the sliders 50 is thus achieved with stability.

In the processing apparatus 10 the plate-shaped elastic member 21 is placed on the X-Y table 13 and the wires 22 are provided on the elastic member 21. Compared to directly placing the wires 22 on the X-Y table 13, the diamond lapping film 24 comes to contact with the first edges 61 and the second edges 62 of the plurality of sliders 50 in a uniform manner.

Figure 5:
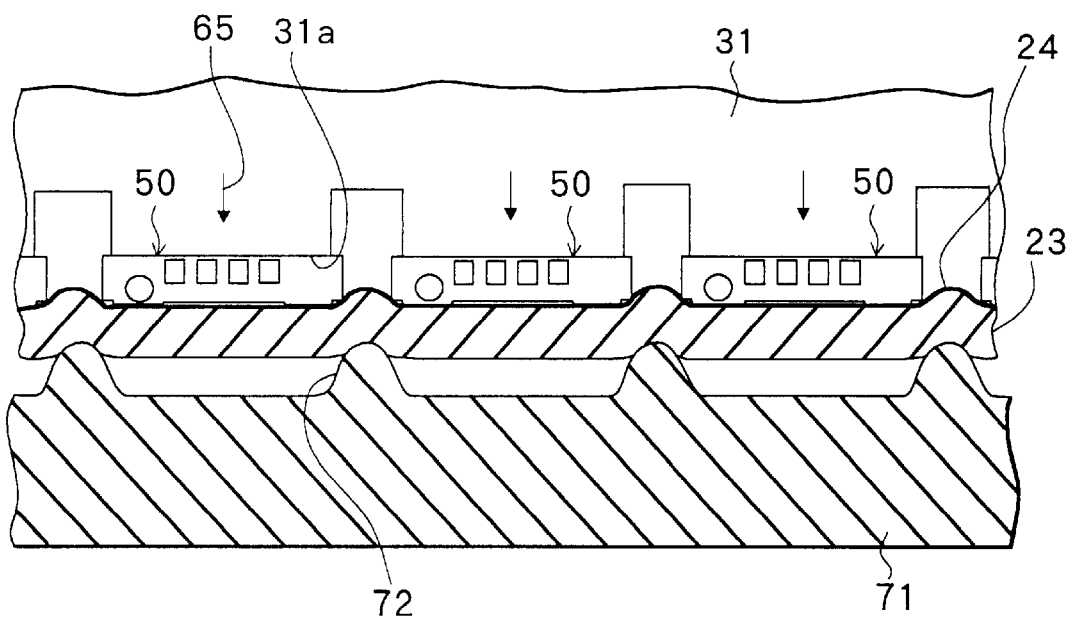
FIG. 5 is a cross section of the main part of another example of apparatus for processing the slider of the first embodiment of the invention.

FIG. 5 is a cross section of the main part of another example of apparatus for obtaining a sliders of the embodiment of the invention. The processing apparatus has a configuration similar to that of the processing apparatus shown in FIG. 1 and FIG. 3 except that the wires 22 are not provided while the elastic member 21 is replaced with an elastic member 71. The elastic member 71 has convexes 72 formed in line on the top surface thereof in positions corresponding to the positions of the wires 22 in the first embodiment. The shape of the upper end of each convexity 72 is preferably a circular arc similar to that of the wire 22. The lapping film retainer 23 is placed on the convexities 72 of the elastic member 71. The lapping film retainer 23 placed on the wires 22 and the diamond lapping film 24 retained by the retainer 23 are thereby deformed so that parts corresponding to the first edges 61 and the second edges 62 of the sliders 50 project towards the first edges 61 and the second edges 62. Consequently, the diamond lapping film 24 is brought to contact with at least the first edges 61 and the second edges 62.

The remainder of the configuration, operation and effects of the example of the processing apparatus shown in FIG. 5 are similar to those of the one shown in FIG. 1 and FIG. 3.

Figure 6:
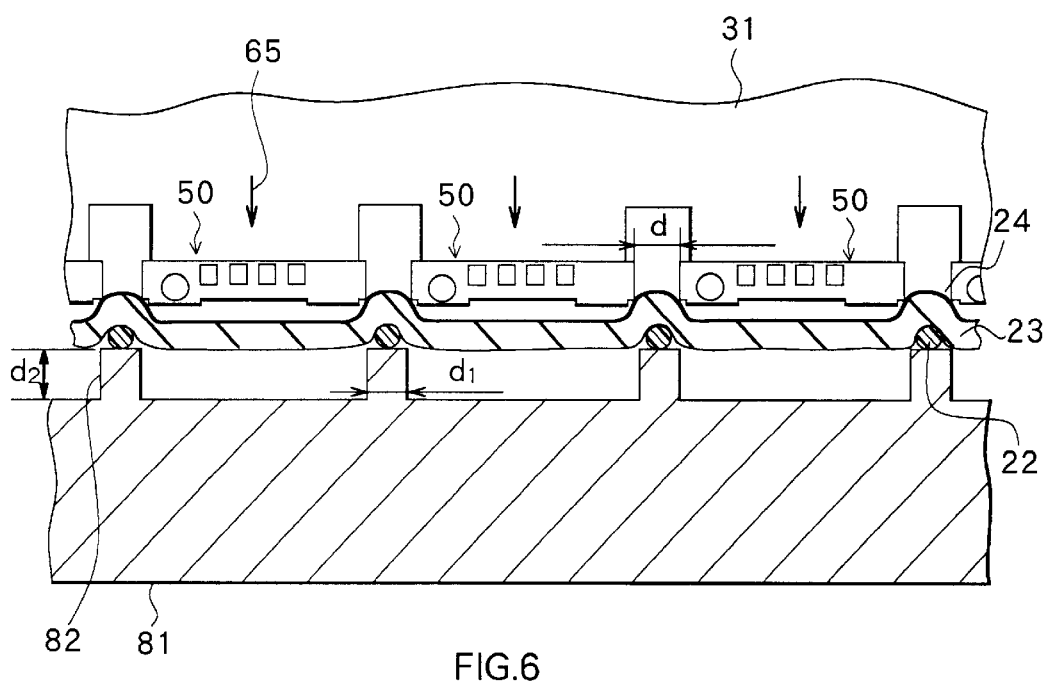
FIG. 6 is a cross section of the main part of still another example of apparatus for processing the slider of the first embodiment of the invention.
Figure 7:
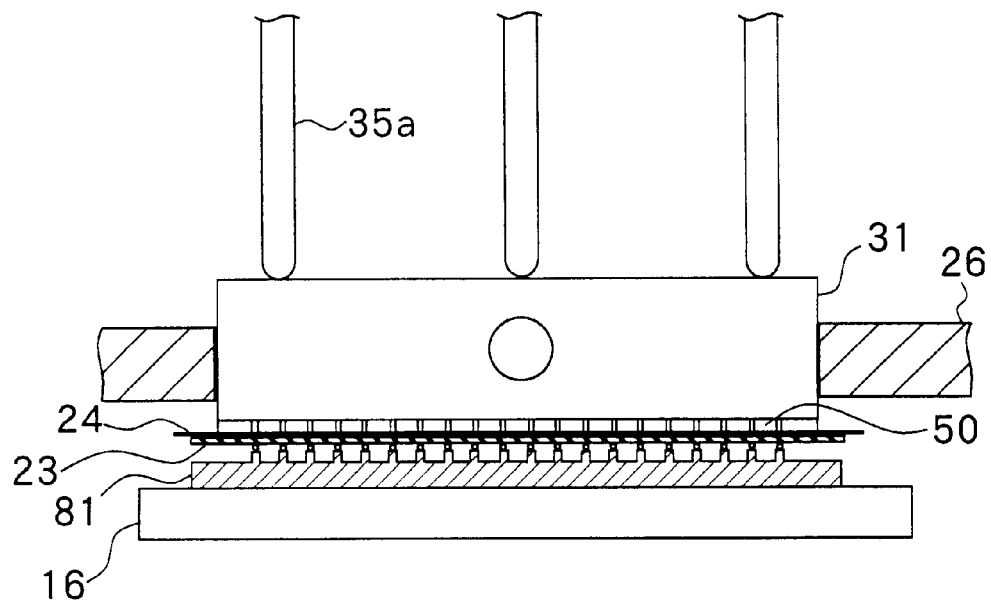
Figure 8:
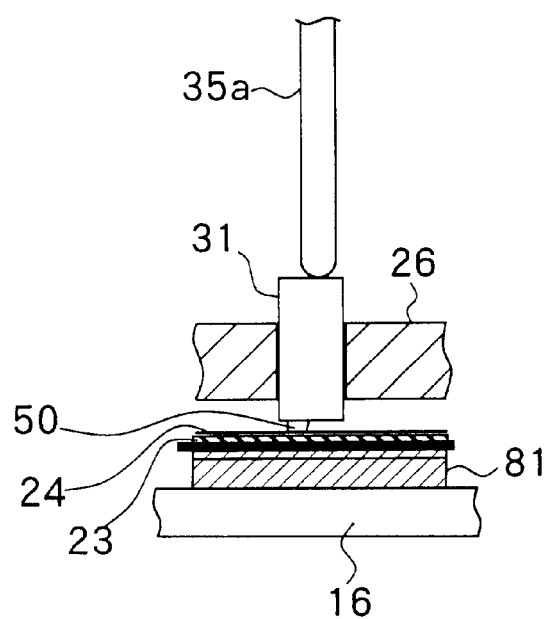
FIG. 8 is a cross section illustrating part of the processing apparatus shown in FIG. 6 including the jig seen sideways.

FIG. 6 to FIG. 8 illustrate still another example of apparatus for processing sliders of the embodiment of the invention. FIG. 6 is a cross section of the main part of the processing apparatus. FIG. 7 is a cross section illustrating part of the processing apparatus including the jig seen head-on. FIG. 8 is a cross section illustrating part of the processing apparatus including the jig seen sideways. As shown in the figures the elastic member 21 of the processing apparatus of the first embodiment is replaced with a deforming member 81 in the third embodiment. The deforming member 81 has a plurality of convexities 82 arranged in line on the top surface thereof in the positions corresponding to the wires 22 in FIG. 3. The cross section of each of the convexities 82 takes the form of rectangle. The wires 22 are each placed on the top surface of each of the convexities 82. Consequently, the lapping film retainer 23 and the diamond lapping film 24 retained by the retainer 23 are deformed so that parts corresponding to the first edges 61 and the second edges 62 project towards the first edges 61 and the second edges 62 by means of the convexities 82 of the deforming member 81 and the wires 22. The diamond lapping film 24 is thereby brought to contact with at least the first edges 61 and the second edges 62.

The deforming member 81 is preferably made of a rigid body so that the convexities 82 are easily formed. In the embodiment the deforming member 81 is made of stainless steel, for example. Width $d_1$ and height $d_2$ of the convex 82 is determined in accordance with separation width 'd' and so on. It is preferable that width $d_1$ of the convexity 82 is determined in a range from 0.05 to 0.20 mm and height $d_2$ of the convexity 82 is determined in a range from 0.10 to 0.50 mm. In the embodiment separation width 'd' is 0.2 mm, width $d_1$ 0.15 mm and height $d_2$ 0.15 mm as an example.

The wires 22 are made of synthetic fibers such as nylon (trade name) or stainless steel, for example. The outer diameter of each of the wires 22 is appropriately determined depending on factors such as separation width 'd'. It is preferable to determine the outer diameter in a range from 0.03 to 0.20 mm. In the embodiment the outer diameter of the wire 22 is 0.09 mm as an example.

The lapping film retainer 23 is made of a material such as silicone rubber. The hardness of the lapping film retainer is preferably in a range from 30 to 60. The hardness is preferably lower for intensive lapping. In the embodiment the hardness of the lapping film retainer is 50. The lapping film retainer 23 preferably has a thickness of 0.10 to 0.30 mm. The thickness is 0.15 mm in the embodiment as an example.

The diamond lapping film 24 is made up of a flexible film and a lapping layer formed thereon, for example. The flexible film may be made of a material such as polyethylene terephthalate (PET). The lapping layer may be formed through applying diamond grains with a binder over the flexible film to be then dried. In the embodiment the diameter of the diamond grain is 0.25 μm. The flexible film preferably has a thickness of 0 to 6 μm. The thickness of 0 μm means that the diamond lapping film 24 is made of diamond grains and a binder without the flexible film. In the embodiment the thickness of the flexible film is 4 μm or 2 μm.

In the example the wires 22 placed on the convexities 82 of the deforming member 81 are capable of being slightly moved with respect to the convexities 82. The effect thereof will now be described.

Although FIG. 6 illustrates the sliders 50 separated from each other fixed to the jig 31, a bar is first bonded to the jig 31 and the bar fixed to the jig 31 is then cut into the individual sliders 50.

Figure 9A:
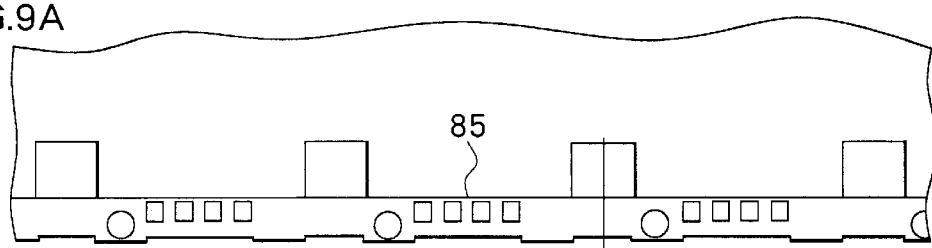
FIG. 9A and FIG. 9B are views for describing effects of the processing apparatus shown in FIG. 6.
Figure 9B:
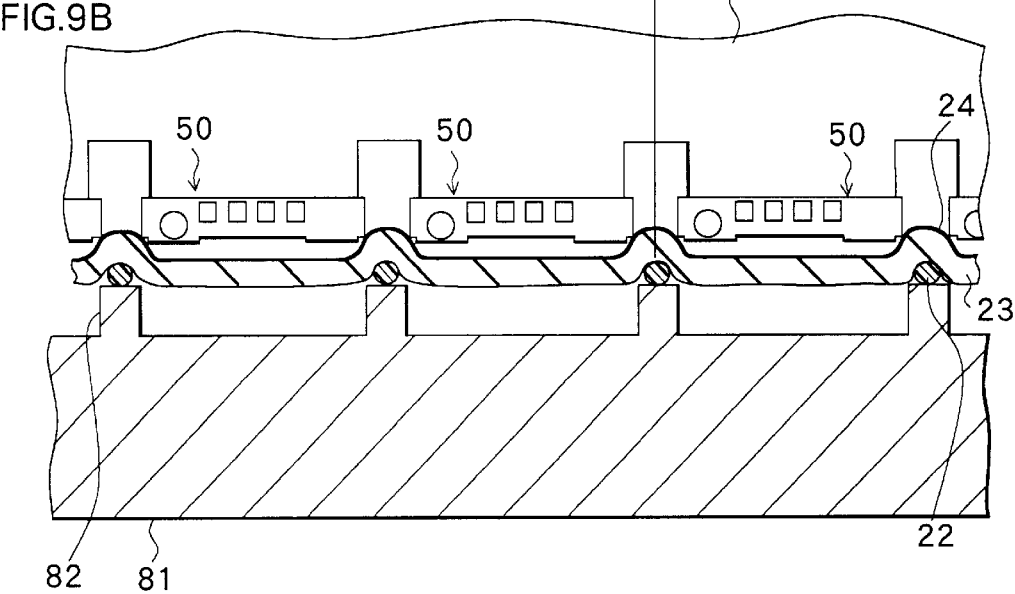
Figure 10A:
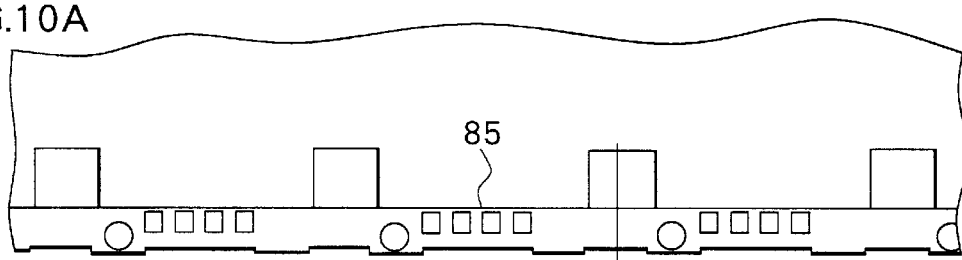
FIG. 10A and FIG. 10B are views for describing effects of the processing apparatus shown in FIG. 6.
Figure 10B:
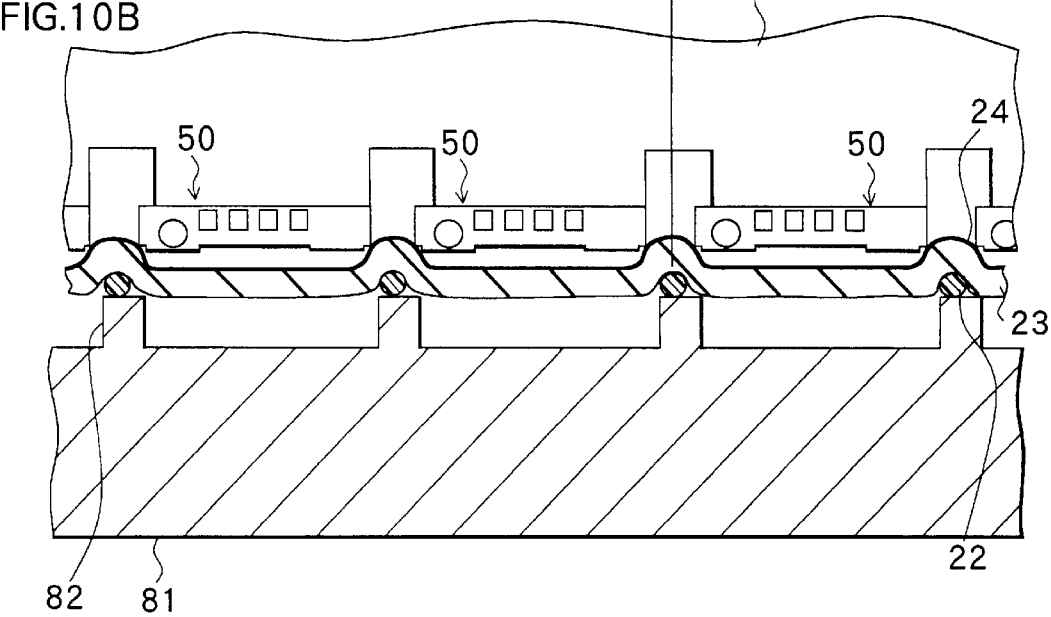
Figure 11A:
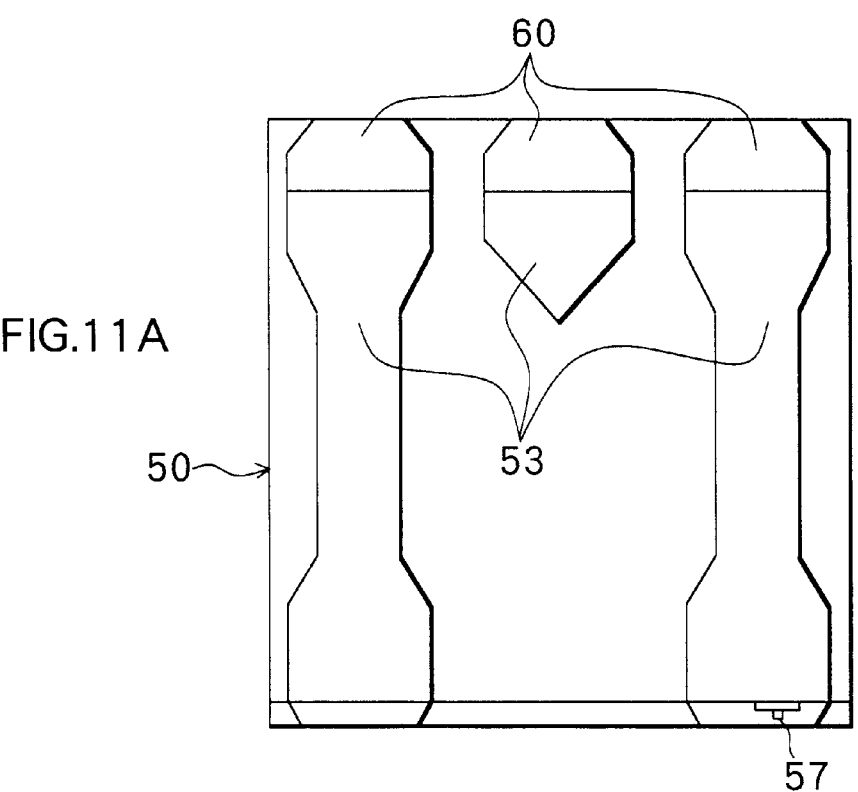
FIG. 11A and FIG. 11B are top views of an example of a slider having a two-level structure.
Figure 11B:
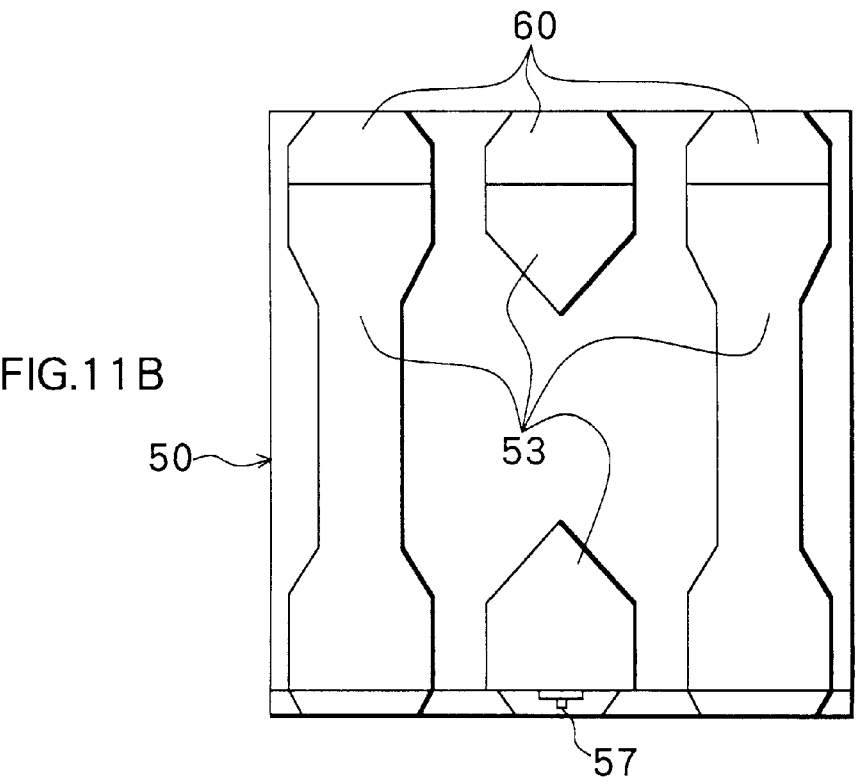
Figure 12:
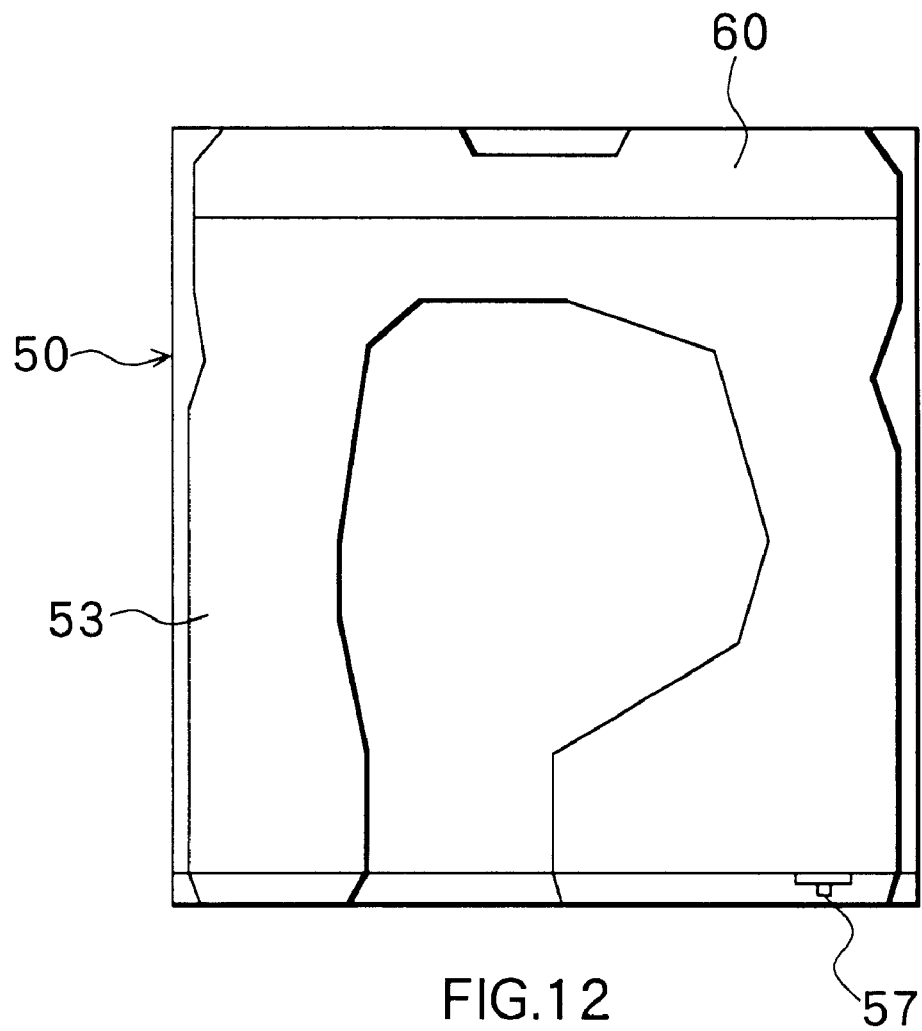
FIG. 12 is a top view of an example of a slider having a two-level structure.
Figure 13:
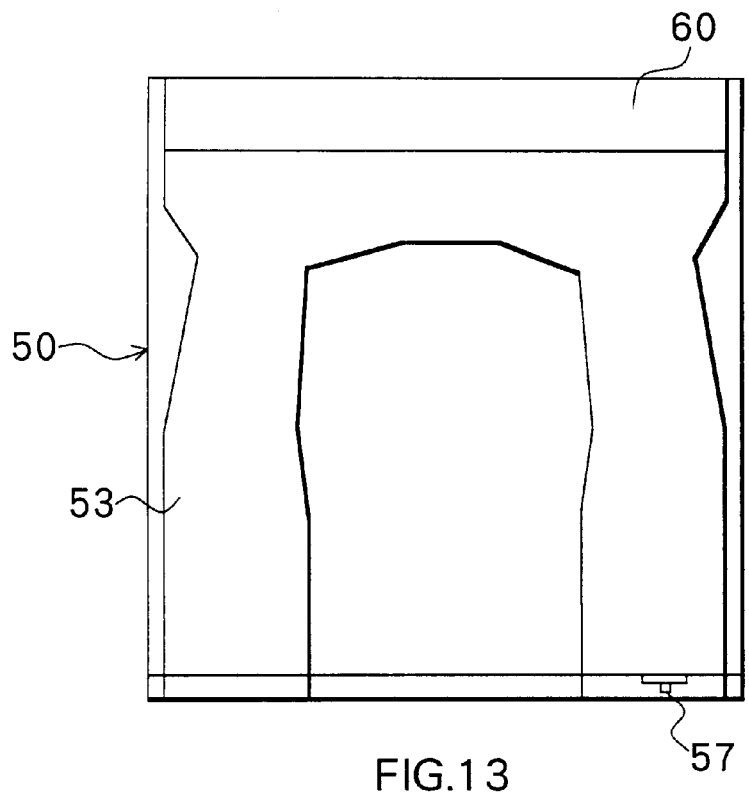
FIG. 13 is a top view of an example of a slider having a two-level structure.

FIG. 9A and FIG. 10A each illustrate a bar 85 bonded to the jig 31. FIG. 9B and FIG. 10B each illustrate the bars 85 shown in FIG. 9A and FIG. 10A, respectively, cut into individual sliders 50. FIG. 9A and FIG. 9B each show the bar 85 properly bonded to the jig 31. FIG. 10A and FIG. 10B each show the position of bonding the bar 85 to the jig 31 being shifted.

For separating the bar 85 into the individual sliders 50, the separating (cutting) position 86 is determined based on the bar 85. Therefore, if the position of bonding the bar 85 to the jig 31 is shifted as shown in FIG. 10A, the positions of the sliders 50 with respect to the jig 31 are shifted as shown in FIG. 10B.

The convexities 82 of the deforming member 81 are positioned based on the jig 31. Therefore, if the position of bonding the bar 85 to the jig 31 is shifted as described above, the positions of the convexities 82 and the separating positions of the sliders 50 with respect to the jig 31 are shifted as shown in FIG. 10B. Therefore, without the wires 22 in this embodiment the diamond lapping film 24 could touch neighboring two of the sliders 50 unevenly and processing could be performed on the sliders unevenly.

In contrast, the wires 22 placed on the convexities 82 of the deforming member 81 are capable of being slightly moved with respect to the convexities 82 in the example. Therefore, if the positions of the convexities 82 and the separating positions of the sliders 50 are shifted as shown in FIG. 10B, the lapping film retainer 23 and the diamond lapping film 24 protruded by means of the wires 22 enter the separation positions. The wires 22 are thereby moved to the positions corresponding to the separation positions. As a result, the diamond lapping film 24 is brought to contact with neighboring two of the sliders 50 evenly. The sliders 50 are thus processed in a uniform manner.

It is possible to achieve a similar effect with the processing apparatus shown in FIG. 1 and FIG. 3, too, to some degree by allowing the wires 22 to move. It is possible to achieve a similar effect with the processing apparatus shown in FIG. 5 as well to some degree since the convexities 72 of the elastic member 71 are capable of being deformed.

The magnetic head element 57 is formed at the end of the slider 50 on the air outflow side. It is therefore preferable that processing made on the edges at the end of the slider 50 on the air outflow side is regulated. In the embodiment the wires 22 are placed on the convexities 82 of the deforming member 81 and the lapping film retainer 23 is then placed on the wires 22. Consequently a great gap is made between the top surface of the deforming member 81 and the lapping film retainer 23 in the section between the neighboring convexities 82. As a result, the diamond lapping film 24 touches the slider 50 in a moderate manner in the section between the neighboring convexities 82. The example thus allows processing made on the edges at the end of the slider 50 on the air outflow side to be regulated.

The remainder of the configuration, operation and effects of the example of the processing apparatus shown in FIG. 6 are similar to those of the one shown in FIG. 1 and FIG. 3.

A slider to which the invention is applied will now be described. The slider has a rail with a medium facing surface forming part of a medium facing surface of the slider, at least part of an outer side (lateral wall) of the rail being located closer to a center of the slider than a lateral wall of the slider. The slider further has a plurality of edges whose positions with respect to the medium facing surface of the slider are different from each other. The slider includes first edges each between the medium facing surface of the rail and the outer side of the rail and a second edge located closer to the lateral wall of the slider than the first edges. Such a slider may take various forms, in addition to the one shown in FIG. 2, as shown in FIG. 11A and FIG. 11B to FIG. 18.

FIG. 11A, FIG. 11B, FIG. 12 and FIG. 13 each illustrates an example of the slider 50 having a two-level structure. The form of the rails 53 are different from each other in these examples. The tapered sections 60 are formed near the end of the rails on the air outflow side in any of the examples. The magnetic head element 57 is formed at the end of the slider 50 on the air outflow side.

Figure 14:
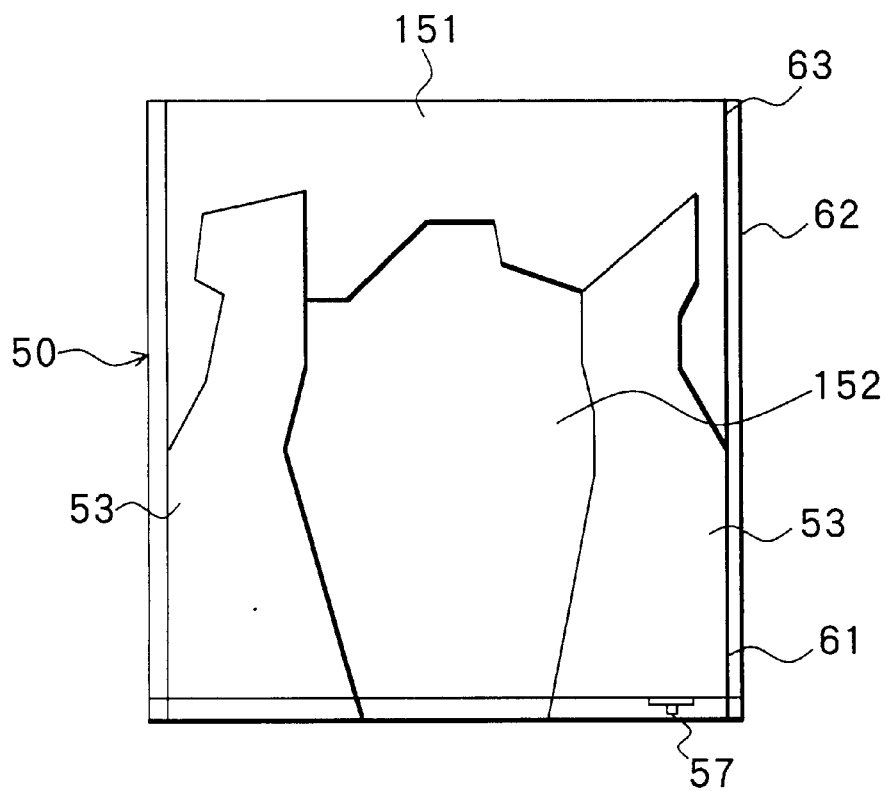
FIG. 14 is a top view of an example of a slider having a three-level structure.
Figure 15:
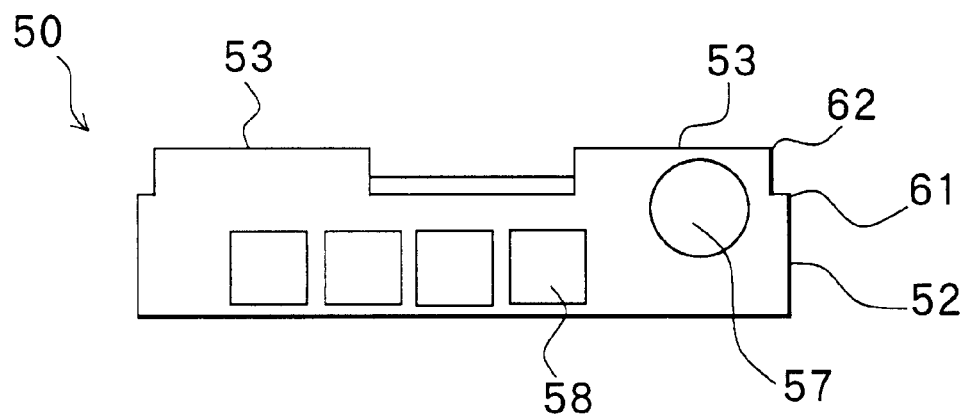
FIG. 15 is a front view of an example of a slider having a three-level structure.
Figure 16:
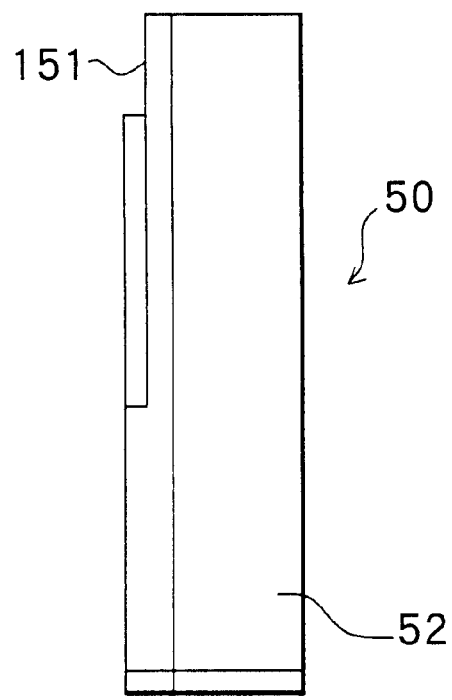
FIG. 16 is a side view of an example of a slider having a three-level structure.

FIG. 14 to FIG. 16 illustrate the slider 50 of a three-level structure having two surfaces positioned at levels different from the medium facing surface of the rails 53 in addition to the medium facing surface of the rails 53. FIG. 14 is a top view of the slider 50. FIG. 15 is a front view of the slider 50. FIG. 16 is a side view of the slider 50. The slider 50 has the two rails 53, a step 151 formed at the air inflow section, and a negative pressure generating section 152 formed from the central part to the air outflow side. Outer sides of the rails 53 are located inside the sides of the slider 50. The slider 50 has third edges 63 in addition to the first edges 61 each between the medium facing surface of the rail 53 and the outer side of the rail 53 and the second edges 62, each placed outside the first edge 61, each between the side of the slider 50 and the surface of the slider 50 to face a recording medium (magnetic disk) and orthogonal to the side of the slider 50. The third edges 63 are edges each between the top surface of the step 151 and the outer side of the step 151. When the slider 50 is processed using the embodiments of the invention, at least the first edges 61 and the second edges 62 are removed. Since the third edges 63 are each between the first edge 61 and the second edge 62, the third edges 63 may touch or may not touch a recording medium depending on the form of the slider 50. If there is a possibility that the third edges 63 may touch a recording medium, the third edges 63 are brought to contact with the diamond lapping film 24 to be removed during a removing process. If there is no possibility that the third edges 63 may touch a recording medium, the third edges 63 may not be brought to contact with the diamond lapping film 24 during a removing process and may not be removed. This results in no problem since there is no possibility that the third edges 63 may touch a recording medium.

Figure 17:
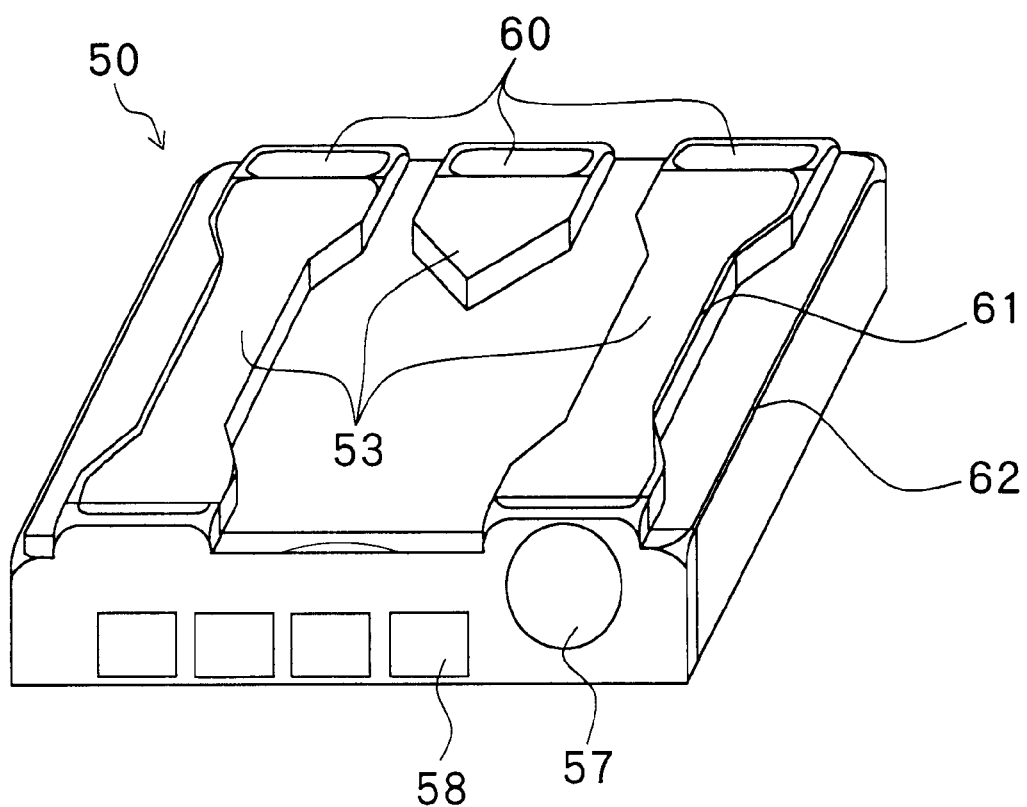
FIG. 17 is a perspective view of the slider shown in FIG. 11, having been processed.

FIG. 17 is a perspective view of the slider 50 shown in FIG. 11, having been processed. During a removing process of the first edges 61 and the second edges 62, as shown in the figure, the embodiments of the invention each allow the diamond lapping film 24 to come to contact with the periphery of the medium facing surface of the rails 53 other than the first edges 61 and with the periphery of the slider 50 on the side of the medium facing surface other than the second edges 62. These sections are removed as well.

The preferable range of radius of curvature of the edges will now be described for the edges of the slider 50 curved in accordance with the embodiments of the invention. First, an example of method for measuring a radius of curvature will be described, using the slider 50 of two-level structure shown in FIG. 18. In this method geometries of an edge portion having been removed (including the edge and corner) are first measured with a surface roughness tracer. The surface roughness tracer used for the measurements is 'Talystep' (trade name) of Rank Tailor-Hobson in the United Kingdom. The needle with a tip of 2 $\mu$m in radius of curvature is used.

Figure 18:
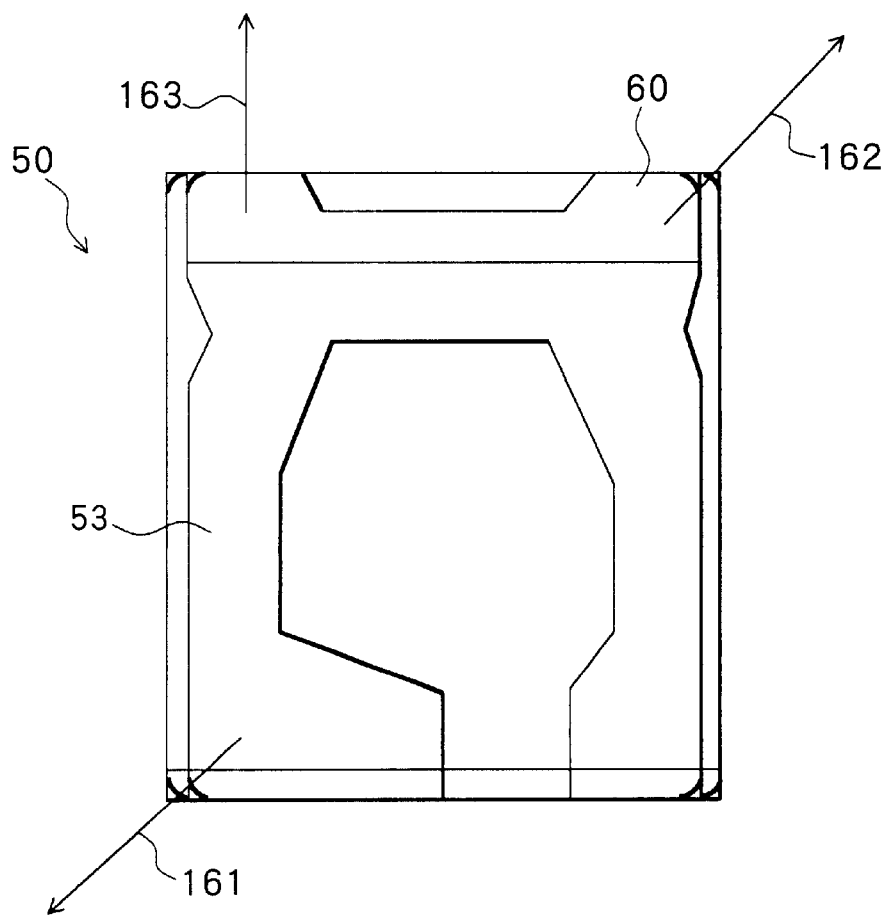
FIG. 18 is a front view of an example of a slider having a two-level structure.
Figure 19:
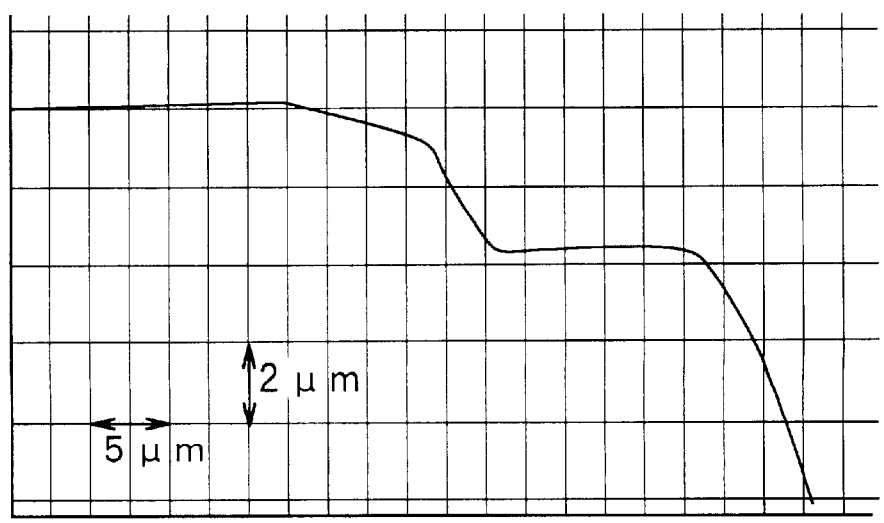
FIG. 19 is a plot for showing measurements made on edge geometries of the slider shown in FIG. 18.
Figure 20:
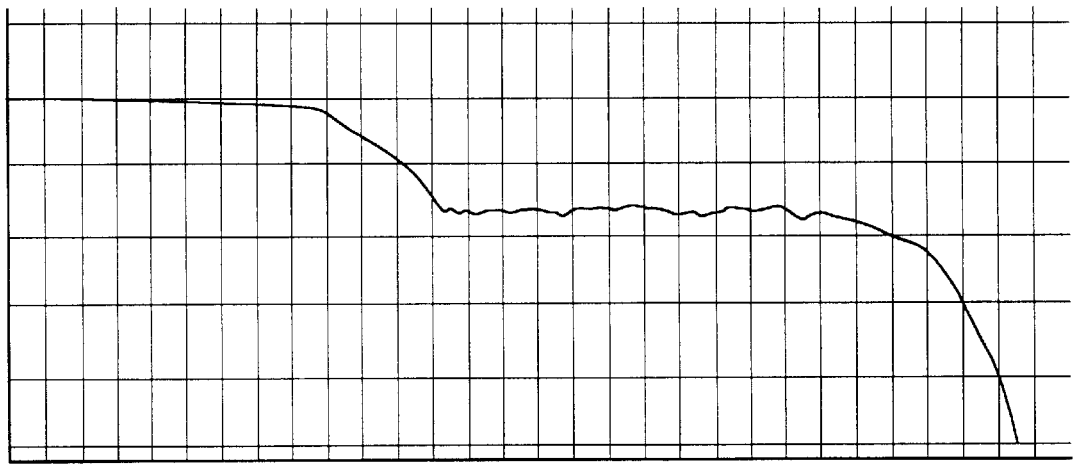
FIG. 20 is a plot for showing measurements made on edge geometries of the slider shown in FIG. 18.
Figure 21:
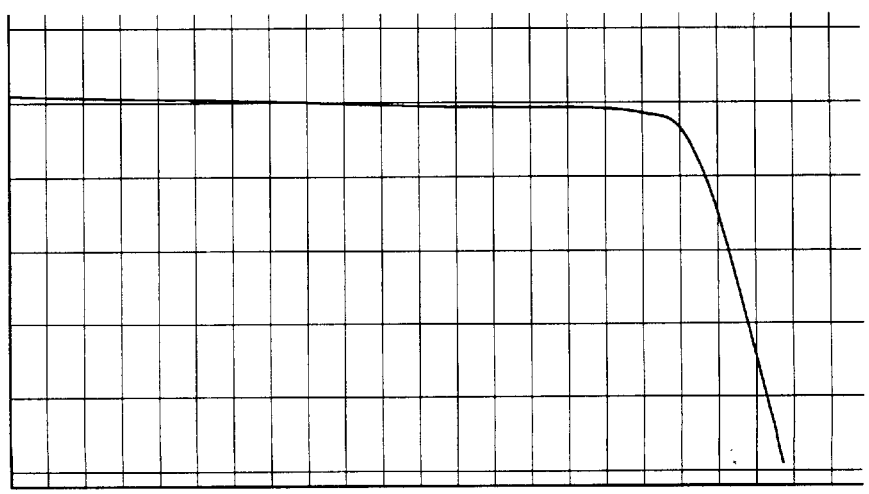
FIG. 21 is a plot for showing measurements made on edge geometries of the slider shown in FIG. 18.

FIG. 19 to FIG. 21 each show measurements made on geometries along arrows 161 to 163 in FIG. 18. The horizontal axis indicates positions in the horizontal direction and the vertical axis indicates positions in the vertical direction in FIG. 19 to FIG. 21. The scale of the horizontal axis is different from that of the vertical axis in these figures as shown in FIG. 19. Since measurements made along arrows 161 and 162 each pass through two edge portions, the geometries thereby measured each include the two curved portions as shown in FIG. 19 and FIG. 20. Since measurements made along arrow 163 pass through one edge portion only, the geometries thereby measured include the one curved portion only as shown in FIG. 21.

In the method for measuring a radius of curvature a circle including the two curved portions is assumed for the geometries including the two curved portions as shown in FIG. 19 and FIG. 20, using the measurements made as described above. The radius of curvature of the circle is then obtained. A circle including the one curved portion is assumed for the geometries including the one curved portion as shown in FIG. 21. The radius of curvature of the circle is then obtained. The radius of curvature obtained for the geometries shown in FIG. 19 is approximately 70 $\mu$m, 250 $\mu$m for those in FIG. 20 and 10 $\mu$m for those in FIG. 21.

Next, a shock resistance test is carried out for determining the preferable range of radius of curvature of the edge portions measured based on the method described above. The result is shown below. In the shock resistance test the slider is brought to contact with a recording medium with a given impact force and whether it is possible to practically use the recording medium is determined. In the result below 'OK' indicates that the recording medium is usable and 'NG' indicates that the recording medium is not usable. 'G' of the impact force means gravitational acceleration.

| | impact force | | |
|---|---|---|---|
| radius of curvature | 400 G | 500 G | 550 G |
| 4 $\mu$m | OK | NG | NG |
| 10 $\mu$m | OK | OK | NG |
| 50 $\mu$m | OK | OK | NG |
| 100 $\mu$m | OK | OK | OK |

The radius of curvature of 4 $\mu$m and that of 10 $\mu$m apply to the geometries including one curved portion only. The radius of curvature of 50 μm and that of 100 μm apply to the geometries including two curved portions.

Resistance to impact force of 500 G or above is required for a magnetic head. As shown in the result above, the radius of curvature of 10 μm satisfies the requirement. Therefore the range of preferable radius of curvature of the edge portions is 10 μm and above as a criterion. However, the radius of curvature of the order of 4 μm may withstand a practical use depending on conditions since shock resistance required depends on the hardness of the recording medium and surface roughness and so on.

Figure 22:
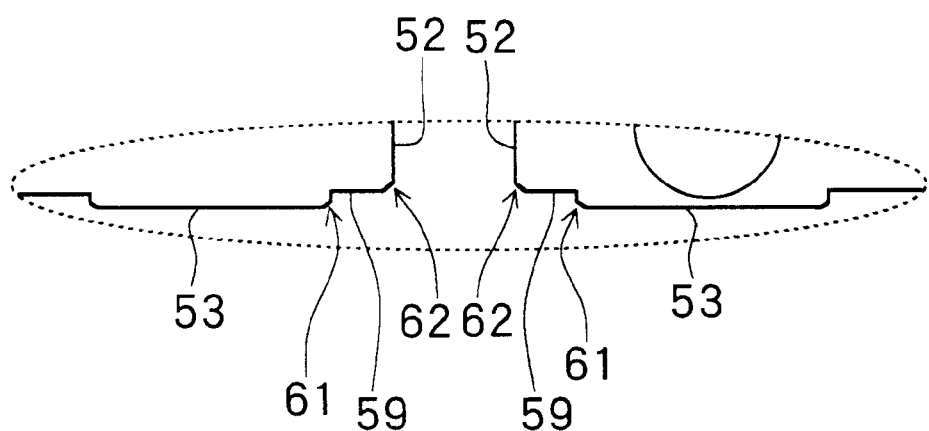
FIG. 22 illustrates the main part of a slider of a second embodiment of the invention.

Reference is now made to FIG. 22 for describing a slider of a second embodiment of the invention. The slider of the embodiment has the first edges 61 and the second edges 62 each removed to form a bevel. FIG. 22 is a magnified view of C in FIG. 3 wherein the first edges 61 and the second edges 62 are each removed to form a bevel. For beveling the first edges 61 and the second edges 62, the X-Y table 13 is driven in the direction of length of the wires 22 or the convexities 72 and 82 (the Y direction) only in each of the foregoing embodiments. The angle of bevel of the first edges 61 and the second edges 62 is appropriately determined in a desirable range.

The remainder of the configuration, operation and effects of the embodiment are similar to those of the first embodiment.

Figure 23A:
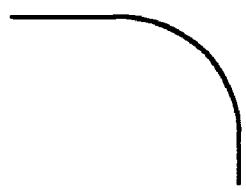
FIG. 23A to FIG. 23D are explanatory views for illustrating examples of edge removing processing in the invention.
Figure 23B:
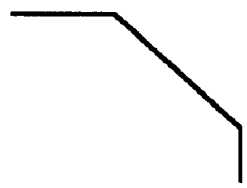
Figure 23C:
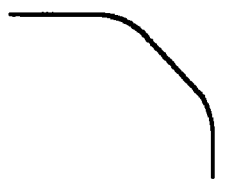
Figure 23D:
Figure 24:
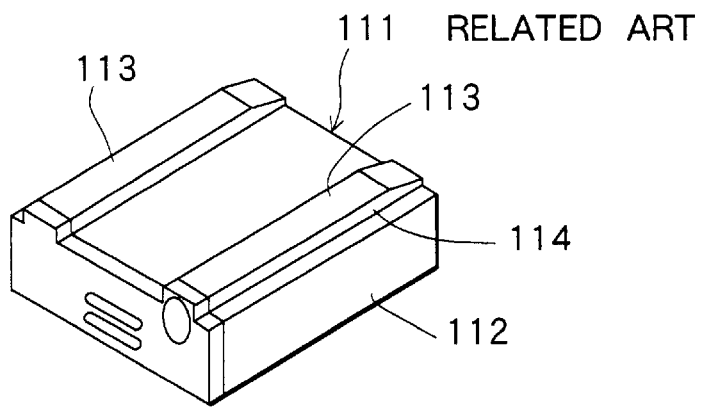
FIG. 24 is a perspective view for illustrating an example of a slider.
Figure 25:
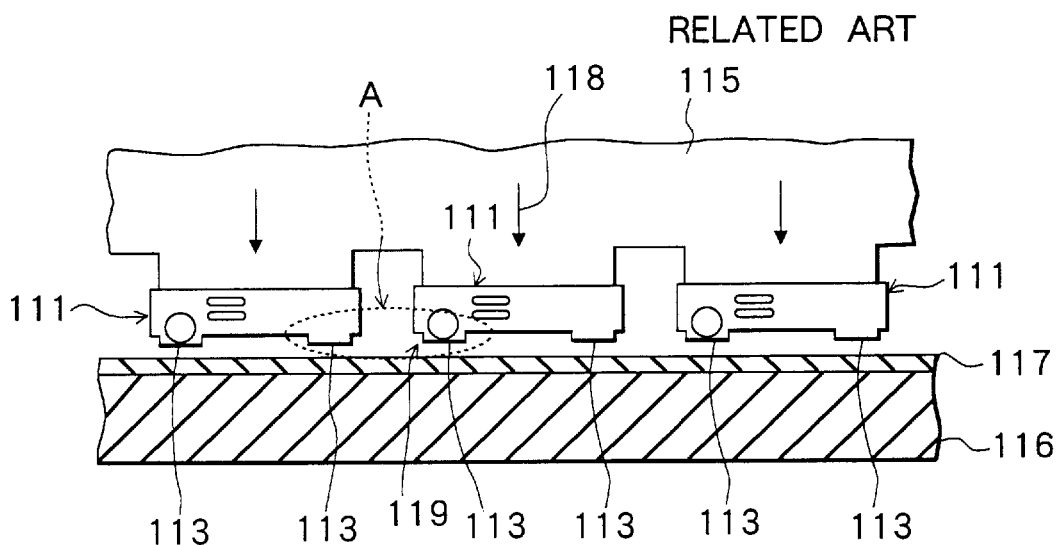
FIG. 25 is a schematic view for illustrating a method of processing sliders of related art.
Figure 26:
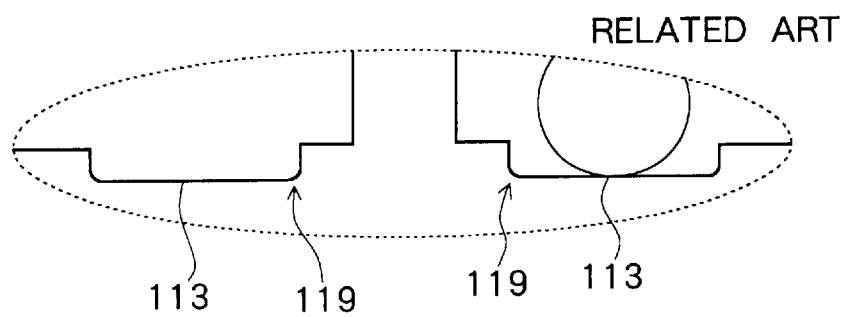
FIG. 26 is a magnified view of section A, the neighborhood of the edges of the rails having been processed in the method shown in FIG. 25.

The present invention is not limited to the embodiments described so far but may be practiced in still other ways. For example, processing of the invention is not limited to have an edge curved as shown in FIG. 23A and an edge beveled as shown in FIG. 23B. Alternatively, an edge may be removed to form both a bevel and a curved surface as shown in FIG. 23C and may be removed to form a plurality of surfaces at gradually varying angles as shown in FIG. 23D.

In the processing apparatus in the foregoing embodiments, the sliders are fixed and the diamond lapping film 24 is moved by means of the X-Y table 13. The diamond lapping film 24 is thereby oscillated towards the first edges 61 and the second edges 62. Alternatively, the diamond lapping film 24 may be fixed and the sliders 50 may be moved (oscillated) by moving the jig 31. The diamond lapping film 24 is thereby oscillated towards the first edges 61 and the second edges 62.

The invention is not limited to the two-level slider but may be applied to a three-level slider as shown in FIG. 14 to FIG. 16 and a four-level slider. The second edge of the two-level slider is the edge between the medium facing surface of the slider and a side of the slider. If a slider with three levels or more has a plurality of edges located closer to a side of the slider than the first edges, one of the edges is the second edge to be removed. Edges other than the first and second edges may be either chamfered or not in the invention.

Although the sliders of the embodiments are negative pressure sliders, the invention may be applied to sliders not generating a negative pressure.

Besides processing of magnetic head sliders, the invention may be applied to removing a plurality of edges with. different levels of objects having two-level ends or more. For example, the invention is applicable to a slider used for any other purpose such as one used for a head (pickup) for recording or reproducing information under the optical recording system or magneto-optical recording system.

As described so far, the slider of the invention has the first edges each between the medium facing surface of the rail and the outer side of the rail and the second edge located closer to the side of the slider than the first edges each removed. As a result, the slider will not scratch a surface of a medium when tilted.

Obviously many modifications and variations of the present invention are possible in the light of the above teachings. It is therefore to be understood that within the scope of the appended claims the invention may be practiced otherwise than as specifically described.

What is claimed is:

1. A slider comprising:
    a medium facing surface that faces toward a medium, a portion of the medium facing surface defining a protruding rail such that a medium facing surface of the rail forms part of the medium facing surface of the slider;
    at least part of a lateral wall of the rail facing outward and being located closer to a center of the slider than a lateral wall of the slider;
    first edges located between the medium facing surface of the rail and the outward facing lateral wall of the rail;
    a second edge located closer to the lateral wall of the slider than the first edges;
    at least the first edges and the second edge are blunt.

2. A slider according to claim 1 wherein the first edges are positioned at a level different from a level at which the second edge is positioned.

3. A slider according to claim 1 wherein the second edge is an edge between the medium facing surface of the slider and the lateral wall of the slider.

4. A slider according to claim 1 wherein the first and second edges are each a curved surface.

5. A slider according to claim 1 wherein the first and second edges are each a bevel.

6. A slider according to claim 1 wherein at least two of the rails are provided and a section for generating negative pressure is provided between the two rails.

7. A slider according to claim 1, wherein a periphery of the medium facing surface of the rail and a periphery of the slider on the side of the medium facing surface of the slider in addition to the first and second edges also are blunt.

8. A slider comprising:
    a medium facing surface that faces toward a medium;
    a rail protruding from the medium facing surface, the rail having a medium facing surface and an outer lateral wall that faces peripherally outward;
    a first edge located between the medium facing surface of the rail and a portion of the outer lateral wall of the rail that is located closer to a center of the slider than a lateral wall of the slider;
    a second edge located closer to the lateral wall of the slider than the first edge;
    at least the first edge and the second edge are rounded.

9. A slider according to claim 8, wherein the slider has an air inflow side, an air outflow side facing in an opposite direction than the air inflow side, and the lateral wall of the slider and the outer lateral wall of the rail extend in a direction from the air inflow side toward the air outflow side.

10. A slider according to claim 9, wherein a periphery of the medium facing surface of the rail and a periphery of the slider on the side of the medium facing surface of the slider in addition to the first and second edges also are rounded.

11. A slider according to claim 9, wherein the first edge is positioned at a level different from a level at which the second edge is positioned.

12. A slider according to claim 9, wherein the second edge is an edge between the medium facing surface of the slider and the lateral wall of the slider.

13. A slider according to claim 9, wherein at least two of the rails are provided, and a section that generates negative pressure is provided between the two rails.

14. A slider comprising:
   a medium facing surface that faces toward a medium;
   a rail protruding from the medium facing surface, the rail having a medium facing surface and an outer lateral wall that faces peripherally outward;
   a first edge located between the medium facing surface of the rail and a portion of the outer lateral wall of the rail that is located closer to a center of the slider than a lateral wall of the slider;
   a second edge located closer to the lateral wall of the slider than the first edge;
   at least the first edge and the second edge are beveled surfaces.

15. A slider according to claim 14, wherein the slider has an air inflow side, an air outflow side facing in an opposite direction than the air inflow side, and the lateral wall of the slider and the outer lateral wall of the rail extend in a direction from the air inflow side toward the air outflow side.

16. A slider according to claim 15, wherein a periphery of the medium facing surface of the rail and a periphery of the slider on the side of the medium facing surface of the slider in addition to the first and second edges also are beveled surfaces.

17. A slider according to claim 15, wherein the first edge is positioned at a level different from a level at which the second edge is positioned.

18. A slider according to claim 15, wherein the second edge is an edge between the medium facing surface of the slider and the lateral wall of the slider.

19. A slider according to claim 15, wherein at least two of the rails are provided, and a section that generates negative pressure is provided between the two rails.

* * * * *

UNITED STATES PATENT AND TRADEMARK OFFICE
CERTIFICATE OF CORRECTION

PATENT NO. : 6,040,959
DATED : March 21, 2000
INVENTOR(S) : Kanji KOBAYASHI et al.

It is certified that error appears in the above-identified patent and that said Letters Patent is hereby corrected as shown below:

Col. 2, line 14, change "15" to --is--.

Col. 2, line 43, change "facing" to --faces--.

Col. 2, line 46, change "edges each" to --edges, each located--.

Col. 2, line 47, change "outer side" to --lateral wall--.

Col. 3, lines 16, change "wall" to --walls--.

Col. 4, line 45, change "wall" to --walls--.

Col. 4, line 46, change "wall" to --walls--.

Col. 6, line 22, change "frames" to --Frames--.

Col. 9, line 51, change "convex" to --convexity--.

Col. 13, line 59, after "with" delete ".".

Signed and Sealed this

Twenty-seventh Day of February, 2001

Attest:

NICHOLAS P. GODICI

*Attesting Officer*          *Acting Director of the United States Patent and Trademark Office*